United States Patent
Lin et al.

(10) Patent No.: US 11,926,242 B2
(45) Date of Patent: Mar. 12, 2024

(54) METHOD, CHARGING-DISCHARGING DEVICE, CLOUD SERVER, SYSTEM AND MEDIUM FOR CHARGING-DISCHARGING INTERACTION

(71) Applicant: Contemporary Amperex Technology Co., Limited, Ningde (CN)

(72) Inventors: Longzhen Lin, Ningde (CN); Yu Yan, Ningde (CN); Xiao Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 322 days.

(21) Appl. No.: 17/566,696

(22) Filed: Dec. 31, 2021

(65) Prior Publication Data

US 2023/0029931 A1 Feb. 2, 2023

Related U.S. Application Data

(63) Continuation of application No. PCT/CN2021/108567, filed on Jul. 27, 2021.

(51) Int. Cl.
*B60L 55/00* (2019.01)
*B60L 53/68* (2019.01)
*H04L 67/12* (2022.01)

(52) U.S. Cl.
CPC .............. *B60L 55/00* (2019.02); *B60L 53/68* (2019.02); *H04L 67/12* (2013.01); *Y04S 10/126* (2013.01)

(58) Field of Classification Search
CPC ........... B60L 55/00; B60L 53/68; H04L 67/12
See application file for complete search history.

(56) References Cited

U.S. PATENT DOCUMENTS

| 2010/0315197 A1 | 12/2010 | Solomon et al. | |
| 2016/0159239 A1* | 6/2016 | Shi | B60L 53/14 |
| | | | 320/134 |
| 2021/0094437 A1* | 4/2021 | Tsubokura | B60L 50/50 |

FOREIGN PATENT DOCUMENTS

| CN | 103869197 A | 6/2014 |
| CN | 107851997 A | 3/2018 |

(Continued)

OTHER PUBLICATIONS

Sunil Chhaya, phD, Distribution System Constrained Vehicle-to-Grid Services for Improved Grid Stability and Reliability, Mar. 1, 2019, 92 pages.

(Continued)

*Primary Examiner* — David V Henze-Gongola
(74) *Attorney, Agent, or Firm* — East IP P.C.

(57) ABSTRACT

The application provides a method, a charging-discharging device, a cloud server, a system and a medium for charging-discharging interaction, which belong to the fields of electric power technologies. The method for charging-discharging interaction includes: the charging-discharging device transmits a vehicle-to-grid V2G function confirmation message to a battery management system of a target vehicle; when no V2G function feedback message fed back by the battery management system is received within a preset period of time after transmitting the V2G function confirmation message, the charging-discharging device transmits a first indication message to a cloud server to indicate that the target vehicle is V2G-disabled; in response to a non-V2G charging instruction received from the cloud server, the charging-discharging device performs a non-V2G charging for the target vehicle. The availability of the charging-discharging device can be improved according to embodiments of the present application.

9 Claims, 9 Drawing Sheets

(56) References Cited

FOREIGN PATENT DOCUMENTS

| | | |
|---|---|---|
| CN | 110994656 A | 4/2020 |
| CN | 111439136 A | 7/2020 |
| CN | 111469683 A | 7/2020 |
| CN | 111725800 A | 9/2020 |
| CN | 112140940 A | 12/2020 |
| CN | 112693356 A | 4/2021 |
| CN | 113067598 A | 7/2021 |

OTHER PUBLICATIONS

The extended European search report for European Application No. 21811229.0, dated Dec. 15, 2022, 9 pages.
The International search report for PCT Application No. PCT/CN2021/108567, dated May 5, 2022, 18 pages.
Chen, Kaiyan et al., Real-time scheduling strategy of electric vehicle based on V2G application, vol. 47, No. 14, Jul. 16, 2019, 9 pages.

* cited by examiner

METHOD, CHARGING-DISCHARGING DEVICE, CLOUD SERVER, SYSTEM AND MEDIUM FOR CHARGING-DISCHARGING INTERACTION

CROSS-REFERENCE TO RELATED APPLICATION

This application is a continuation of International Application No. PCT/CN2021/108567, filed on Jul. 27, 2021 and titled "METHOD, CHARGING-DISCHARGING DEVICE, CLOUD SERVER, SYSTEM AND MEDIUM FOR CHARGING-DISCHARGING INTERACTION", the content of which is incorporated herein by reference in its entirety.

FIELD

The present application relates to the fields of electric power technologies, in particular to a method, a charging-discharging device, a cloud server, a system and a medium for charging-discharging interaction.

BACKGROUND

The vehicle-to-grid (V2G) technology refers to a technology which enables the bi-directional flow of energy between the vehicle and the grid. A grid can charge the vehicle through a V2G technology-enabled charging-discharging device, and the vehicle can transfer electric energies to the grid through the V2G technology-enabled charging-discharging device.

Since the V2G technology is a relatively new technology, currently not all vehicles in use are V2G-enabled. If a V2G-disabled vehicle is connected with a V2G-enabled charging-discharging device, the V2G-enabled charging-discharging device cannot charge the V2G-disabled vehicle, which reduces the availability of the charging-discharging device.

SUMMARY

Embodiments of the present application provide a method, a charging-discharging device, a cloud server, a system and a medium for charging-discharging interaction.

In a first aspect, an embodiment of the present application provides a method for charging-discharging interaction, comprising: transmitting, by a charging-discharging device, a vehicle-to-grid (V2G) function confirmation message to a battery management system of a target vehicle; transmitting, by the charging-discharging device, a first indication message to a cloud server to indicate that the target vehicle is V2G-disabled, when no V2G function feedback message fed back by the battery management system is received within a preset period of time after transmitting the V2G function confirmation message; performing, by the charging-discharging device, a non-V2G charging for the target vehicle, in response to a non-V2G charging instruction received from the cloud server.

In some possible embodiments, the non-V2G charging instruction is transmitted by the cloud server in response to the first indication message.

In some possible embodiments, the non-V2G charging instruction is transmitted by the cloud server in response to a non-V2G charging mode selection instruction from a terminal device, which is communicatively connected with the cloud server.

In some possible embodiments, before the transmitting, by a charging-discharging device, a V2G function confirmation message to a battery management system of a target vehicle, the method further comprises: transmitting, by the charging-discharging device, a wake-up signal to the battery management system to wake up the battery management system.

In some possible embodiments, after the transmitting, by a charging-discharging device, a V2G function confirmation message to a battery management system of a target vehicle, the method further comprises: transmitting, by the charging-discharging device, a second indication message to the cloud server to indicate that the target vehicle is V2G-enabled, when a V2G function feedback message fed back by the battery management system is received within a preset period of time after transmitting the V2G function confirmation message; performing, by the charging-discharging device, a V2G charging or V2G discharging for the target vehicle, in response to a received grid scheduling instruction.

In a second aspect, an embodiment of the present application provides a method for charging-discharging interaction, which comprises: receiving, by a cloud server, a first indication message from a charging-discharging device, wherein the first indication message is transmitted by the charging-discharging device when no V2G function feedback message is received within a preset period of time after transmitting a V2G function confirmation message to a battery management system of a target vehicle, and the first indication message is to indicate that the target vehicle is V2G-disabled; transmitting, by the cloud server, a non-V2G charging instruction to the charging-discharging device, to instruct the charging-discharging device to perform a non-V2G charging for the target vehicle.

In some possible embodiments, the transmitting, by the cloud server, a non-V2G charging instruction to the charging-discharging device comprises: transmitting, by the cloud server, the non-V2G charging instruction to the charging-discharging device, in response to the first indication message.

In some possible embodiments, before the transmitting, by the cloud server, a non-V2G charging instruction to the charging-discharging device, the method further comprises: transmitting, by the cloud server, a third indication message to a terminal device, to indicate that the target vehicle is V2G-disabled; receiving, by the cloud server, a non-V2G charging mode selection instruction from the terminal device.

The transmitting, by the cloud server, a non-V2G charging instruction to the charging-discharging device comprises: transmitting, by the cloud server, the non-V2G charging instruction to the charging-discharging device, in response to the non-V2G charging mode selection instruction.

In some possible embodiments, the method for charging-discharging interaction further comprises: receiving, by the cloud server, a second indication message from the charging-discharging device, wherein the second indication message is transmitted by the charging-discharging device when a V2G function feedback message is received within a preset period of time after transmitting a V2G function confirmation message to a battery management system of a target vehicle, and the second indication message is to indicate that the target vehicle is V2G-enabled; transmitting, by the cloud server, a fourth indication message to a terminal device to indicate that the target vehicle is V2G-enabled, in response to the second indication message, wherein the terminal device is communicatively connected with the cloud server.

In a third aspect, an embodiment of the present application provides a charging-discharging device, comprising: a transmitting module, configured to transmit a V2G function confirmation message to a battery management system of a target vehicle, and to transmit a first indication message to a cloud server to indicate that the target vehicle is V2G-disabled, when no V2G function feedback message fed back by the battery management system is received within a preset period of time after transmitting the V2G function confirmation message; a performing module, configured to perform a non-V2G charging for the target vehicle in response to a non-V2G charging instruction received from the cloud server.

In a fourth aspect, an embodiment of the present application provides a cloud server, comprising: a receiving module, configured to receive a first indication message from a charging-discharging device, wherein the first indication message is transmitted by the charging-discharging device when no V2G function feedback message is received within a preset period of time after transmitting a V2G function confirmation message to a battery management system of a target vehicle, and the first indication message is to indicate that the target vehicle is V2G-disabled; a transmitting module, configured to transmit a non-V2G charging instruction to the charging-discharging device, to instruct the charging-discharging device to perform a non-V2G charging for the target vehicle.

In a fifth aspect, an embodiment of the present application provides a charging-discharging device, comprising: a processor; and a memory storing computer program instructions, wherein the processor, when executing the computer program instructions, implements the method for charging-discharging interaction according to the first aspect.

In a sixth aspect, an embodiment of the present application provides a cloud server, comprising: a processor; and a memory storing computer program instructions, wherein the processor, when executing the computer program instructions, implements the method for charging-discharging interaction according to the second aspect In a seventh aspect, an embodiment of the present application provides a charge-discharge system, comprising the charging-discharging device according to the fifth aspect, and the cloud server according to the sixth aspect.

In some possible embodiments, the charge-discharge system further comprises a terminal device, configured to receive, from the cloud server, an indication message indicating that the target vehicle is V2G-enabled, or an indication message indicating that the target vehicle is V2G-disabled.

In an eighth aspect, an embodiment of the present application provides a computer-readable storage medium, having computer program instructions stored thereon, which, when executed by a processor, implement the method for charging-discharging interaction according to the first aspect.

In a ninth aspect, an embodiment of the present application provides a computer-readable storage medium, having computer program instructions stored thereon, which, when executed by a processor, implement the method for charging-discharging interaction according to the second aspect.

BRIEF DESCRIPTION OF THE DRAWINGS

In order to illustrate the technical solution of embodiments of the present application in a clearer way, the drawings required in the embodiments of the present application will be briefly introduced below. For those of ordinary skill in the art, other drawings can also be obtained according to these drawings without exercise of inventive work.

DETAILED DESCRIPTION

Figure 1:
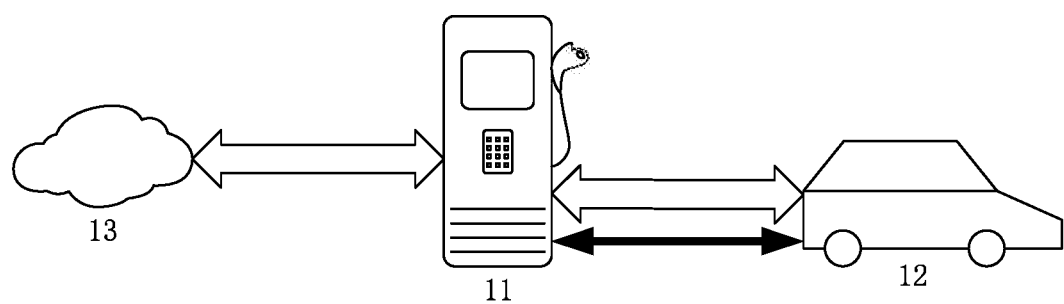
FIG. 1 is a schematic diagram of an example of an application scenario of the method for charging-discharging interaction provided by the embodiment of the present application.

The implementation of the present application is further described in detail below in conjunction with the drawings and embodiments. The detailed description and drawings of embodiments below are used to exemplarily illustrate the principles of the present application, but cannot be used to limit the scope of the present application, that is, the present application is not limited to the described embodiments.

In the description of the present application, it should be noted that, unless otherwise stated, "multiple" means more than two; the orientation or position relationship indicated by terms such as "above", "below", "left", "right", "inside" and "outside" is only for the ease of the description of the present application and the simplification of the description, rather than to indicate or imply that the device or component referred to must have a specific orientation, or must be constructed and operated in a specific orientation, and therefore cannot be understood as a restriction on the present application. In addition, the terms "first", "second" and "third" are used only for the purpose of description, and cannot be understood to indicate or imply relative importance. "Vertical" is not vertical in a strict sense, but within the range of allowable error. "Parallel" is not parallel in a strict sense, but within the range of allowable error.

The orientation words that appear in the following description are the directions shown in the figure, and do not define the specific structure of the present application. In the description of the present application, it should also be noted that, unless otherwise clearly specified and defined, the terms "connecting", "connection" and "connected" should be understood in a broad sense, for example, it can be a fixed connection or a detachable connection, or an integral connection; it can be a direct connection or an indirect connection through an intermediary. For those of ordinary skill in the art, the specific meaning of the forgoing terms in the present application can be understood according to the specific circumstances.

The vehicle-to-grid (V2G) technology refers to a technology which enables the bi-directional flow of energies between the vehicle and the grid. A grid can charge the vehicle through a V2G technology-enabled charging-discharging device, and the vehicle can transfer electric energies to the grid through the V2G technology-enabled charging-discharging device. The vehicle can use a power battery as a power source, and specifically, the V2G technology can be regarded as a technology which enables the bi-directional flow of energies between the power battery of the vehicle and the grid.

Since the V2G technology is a relatively new technology, currently not all vehicles are V2G-enabled. A V2G-enabled charging-discharging device cannot charge a V2G-disabled vehicle, which reduces the availability of the charging-discharging device.

Embodiments of the present application provide a method, a charging-discharging device, a cloud server, a system and a medium for charging-discharging interaction, which can enable a V2G-enabled charging-discharging device to charge a V2G-disabled vehicle.

In some cases, the method for charging-discharging interaction in embodiments of the present application may involve a vehicle, a charging-discharging device and a cloud server. FIG. 1 is a schematic diagram of an example of an application scenario of the method for charging-discharging interaction provided by the embodiment of the present application. As shown in FIG. 1, the charging-discharging device 11 can make a communication interaction and an energy interaction with the vehicle 12, and the charging-discharging device 11 can make a communication interaction with the cloud server 13. In FIG. 1, the hollow arrow indicates the communication interaction, and the solid arrow indicates the energy interaction.

Figure 2:
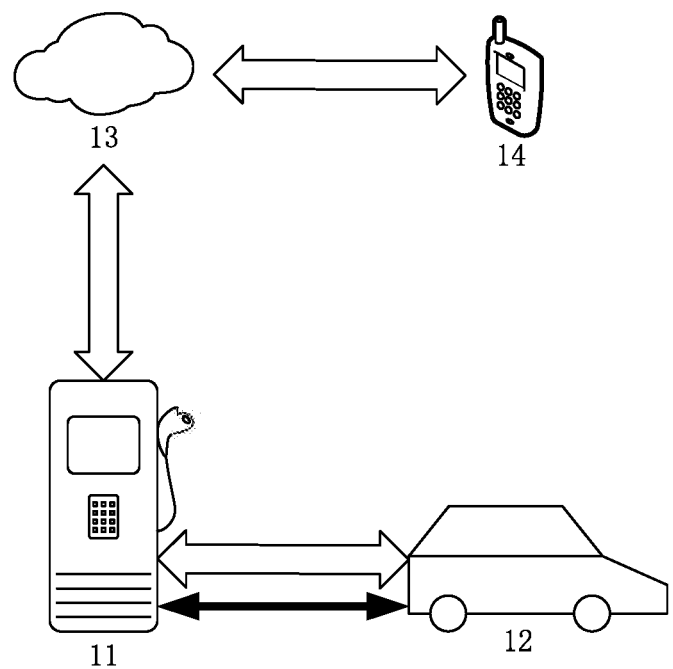
FIG. 2 is a schematic diagram of another example of the application scenario of the method for charging-discharging interaction provided by the embodiment of the present application.

In other cases, the method for charging-discharging interaction in embodiments of the present application may involve a vehicle, a charging-discharging device, a cloud server and a terminal device. FIG. 2 is a schematic diagram of another example of the application scenario of the method for charging-discharging interaction provided by the embodiment of the present application. The difference between FIG. 2 and FIG. 1 is in that the application scenario further involves a terminal device 14. The terminal device 14 may make a communication interaction with the cloud server 13. In FIG. 2, the hollow arrow indicates the communication interaction, and the solid arrow indicates the energy interaction.

The charging-discharging device 11 is a V2G-enabled charging-discharging device 11. The charging-discharging device 11 may include a device (e.g. a charging pile, a charging station, and the like), that is V2G-enabled and capable of charging and discharging, but the present application is limited in this respect.

The vehicle 12 is provided with a power battery and a battery management system (BMS). The communication interaction between the charging-discharging device 11 and the vehicle 12 is specifically the communication interaction between the charging-discharging device 11 and the battery management system in the vehicle 12. The energy interaction between the charging-discharging device 11 and the vehicle 12 is specifically the energy interaction between the charging-discharging device 11 and the power battery in the vehicle 12.

The cloud server 13 makes a communication interaction with the charging-discharging device 11, and the cloud server 13 can obtain information from the charging-discharging device 11, and can also control, through an instruction, the charging-discharging device 11 to perform the operation corresponding to the instruction.

The terminal device 14 makes a communication interaction with the cloud server 13. The terminal device 14 may provide a selectable energy exchange mode to a user by means of display, sound, etc. The terminal device 14 may be specifically implemented as a mobile phone, a computer, a tablet computer, etc. In some examples, the terminal device 14 may be integrated with the charging-discharging device 11.

The method for charging-discharging interaction in the embodiment of the present application is described in detail below.

Figure 3:
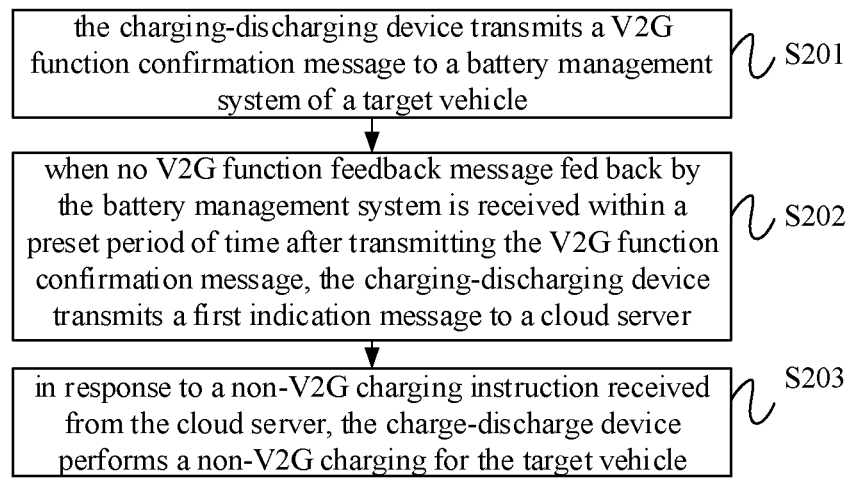
FIG. 3 is a flow chart of an embodiment of a method for charging-discharging interaction provided by the present application, which is applied to a charging-discharging device.

The embodiment of the present application provides a method for charging-discharging interaction, which can be performed by a charging-discharging device. FIG. 3 is a flow chart of an embodiment of a method for charging-discharging interaction provided by the present application, which is applied to a charging-discharging device. As shown in FIG. 3, the method for charging-discharging interaction may include steps S201 to S203.

In step S201, the charging-discharging device transmits a V2G function confirmation message to a battery management system of a target vehicle.

The target vehicle is a vehicle electrically connected to the charging-discharging device. For example, the charging-discharging device is a charging pile, and the target vehicle is a vehicle with a charging gun inserted into the charging pile.

The V2G function confirmation message is used to confirm whether the target vehicle is V2G-enabled. Specifically, the V2G function confirmation message can be implemented as a CDC message or other types of messages, but the present application is limited in this respect.

The V2G function means that the vehicle can bidirectionally exchange energy with the charging-discharging device using the V2G technology, under scheduling performed by the grid such as the State Grid.

In step S202, the charging-discharging device transmits a first indication message to a cloud server, when no V2G function feedback message fed back by the battery management system is received within a preset period of time after transmitting the V2G function confirmation message.

The preset period of time is a time threshold used to determine whether a feedback timeout occurs. The charging-discharging device does not receive a V2G function feedback message from the battery management system within the preset period of time after transmitting the V2G function confirmation message, and it is indicated that there is no feedback before timeout, and the charging-discharging device can determine that the target vehicle is V2G-disabled. The preset period of time can be set according to specific scenarios and requirements, but is not limited here. For example, the preset period of time can be 5 seconds.

When it is determined that the target vehicle is V2G-disabled, the cloud server can be informed that the target vehicle is V2G-disabled. The charging-discharging device can inform the cloud server through the first indication message. The first indication message is used to indicate that the target vehicle is V2G-disabled.

In step S203, the charging-discharging device performs a non-V2G charging for the target vehicle in response to a non-V2G charging instruction received from the cloud server.

When the cloud server determines that the target vehicle is V2G-disabled, it can transmit a non-V2G charging instruction to the charging-discharging device. In response to the non-V2G charging instruction, the charging-discharging device performs the non-V2G charging for the target vehicle.

Figure 4:
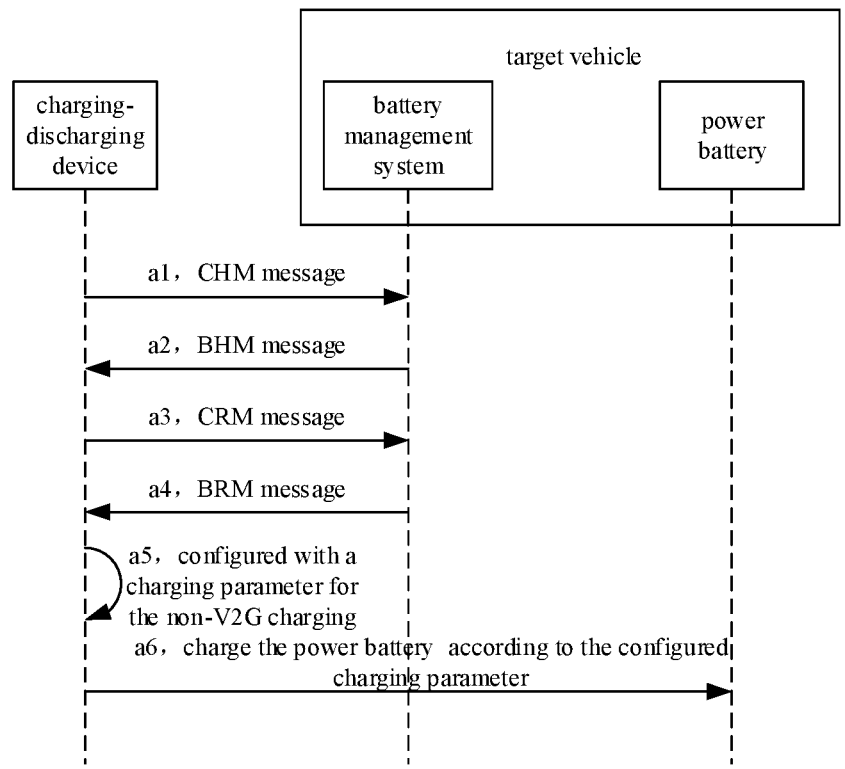
FIG. 4 is a flowchart of an example of a process of a non-V2G charging between the charging-discharging device and the target vehicle, provided by the embodiment of the present application.

The non-V2G charging is a conventional charging, which does not need to wait for the scheduling performed by the grid. FIG. 4 is a flowchart of an example of a process of a non-V2G charging between the charging-discharging device and the target vehicle, provided by the embodiment of the present application. The target vehicle includes a battery management system and a power battery. As shown in FIG. 4, when the battery management system of the target vehicle is in the working state, the process of the non-V2G charging may include the following steps a1 to a6:

step a1, where the charging-discharging device transmits a charger handshake message i.e. CHM message) to the battery management system;

step a2, where the battery management system transmits a battery management system handshake message (i.e. the BHM message) to the charging-discharging device, that is, the charging-discharging device receives the BHM message transmitted by the battery management system;

step a3, where the charging-discharging device transmits a charger recognition message (i.e. CRM message) to the battery management system;

step a4, where the battery management system transmits a battery management system recognition message (i.e. BRM message) to the charging-discharging device, that is, the charging-discharging device receives the BRM message transmitted by the battery management system;

step a5, where the charging-discharging device is configured with a charging parameter for the non-V2G charging;

step a6, where the charging-discharging device charges the power battery in the target vehicle according to the configured charging parameter.

If the battery management system of the target vehicle is in a sleeping state, before performing step a1, the charging-discharging device may transmit a sleep wake-up signal to the battery management system to wake up the battery management system.

In embodiments of the present application, the charging-discharging device firstly transmits a V2G function confirmation message to a battery management system of a target vehicle, and does not receive any V2G function feedback message fed back by the battery management system within a preset period of time after transmitting the V2G function confirmation message, and it is indicated that the target vehicle is V2G-disabled. The charging-discharging device informs, through a first indication message, a cloud server that the target vehicle is V2G-disabled, and then the cloud server instructs, through a non-V2G charging instruction, the charging-discharging device to perform a non-V2G charging for the target vehicle, such that a V2G-enabled charging-discharging device can charge a V2G-disabled vehicle, thus improving the availability of the charging-discharging device.

In some examples, the cloud server may transmits the non-V2G charging instruction directly to the charging-discharging device in response to the first indication message. That is, the non-V2G charging instruction is transmitted by the cloud server in response to the first indication message.

The cloud server transmits the non-V2G charging instruction directly to the charging-discharging device, which makes the process of the non-V2G charging for a V2G-disabled target vehicle performed by the charging-discharging device more convenient and faster.

In other examples, the cloud server is communicatively connected with the terminal device. In response to the first indication message, the cloud server may transmit an indication message to the terminal device indicating that the target vehicle is V2G-disabled, to inform the terminal device that the target vehicle is V2G-disabled. The terminal device may transmit a prompt message by means of display, sound, etc., to prompt the user that the target vehicle is V2G-disabled. The terminal device may further provide users with a selectable energy exchange mode by means of display, voice control, keystrokes and so on. For example, the energy exchange mode may include a non-V2G charging mode and a V2G function mode. The user may select the desired energy exchange mode through an input operation. The terminal device may transmit a mode selection instruction to the cloud server, in response to an input of the user. In response to the mode selection instruction, the cloud server may transmit a corresponding indication instruction to the charging-discharging device. When it is determined that the target vehicle is V2G-disabled, the terminal device transmits a non-V2G charging mode selection instruction to the cloud server in response to the non-V2G charging mode selection input of the user. In response to the non-V2G charging mode selection instruction, the cloud server transmits a non-V2G charging instruction to the charging-discharging device. That is, the non-V2G charging instruction is transmitted by the cloud server in response to the non-V2G charging mode selection instruction from the terminal device.

The cloud server may interact with the terminal device, so that a user can participate in the process of a non-V2G charging for a V2G-disabled target vehicle by operating the terminal device, and the user can know relevant information in time indicating that the target vehicle is V2G-disabled, and thus the user experience is improved.

In order to reduce power consumption, the battery management system may be in a sleeping state when it is not required to be used. In order to enable the battery management system to interact with the charging-discharging device quickly, the charging-discharging device may transmit a wake-up signal to the battery management system before transmitting the V2G function confirmation message to the battery management system. The wake-up signal is used to wake up the battery management system.

In some examples, the charging-discharging device is a charging pile, and when a charging gun of the charging pile is inserted into the target vehicle, the charging pile outputs an A+ signal to the battery management system of the target vehicle, wherein the A+ signal is the wake-up signal. The battery management system receives the A+ signal, exits from the sleeping state and enters the working state.

Figure 5:
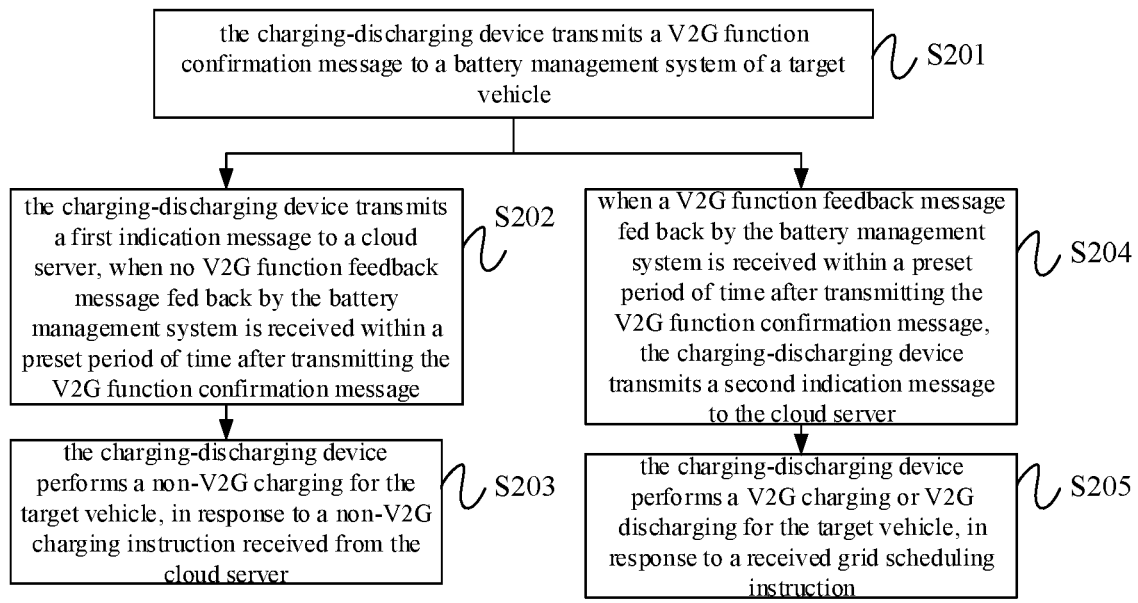
FIG. 5 is a flow chart of another embodiment of a method for charging-discharging interaction provided by the present application, which is applied to a charging-discharging device.

When the target vehicle is V2G-enabled, the charging-discharging device can perform a V2G charging or V2G discharging for the target vehicle. FIG. 5 is a flow chart of another embodiment of a method for charging-discharging interaction provided by the present application, which is applied to a charging-discharging device. The difference between FIG. 5 and FIG. 3 is in that FIG. 5 may further include steps S204 and S205.

In step S204, when a V2G function feedback message fed back by the battery management system is received within a preset period of time after transmitting the V2G function confirmation message, the charging-discharging device transmits a second indication message to the cloud server.

When the charging-discharging device receives a V2G function feedback message from the battery management system within a preset period of time after transmitting the V2G function confirmation message, it can be determined that the target vehicle is V2G-enabled. The V2G function feedback message is used to indicate that the target vehicle is V2G-enabled. Specifically, the V2G function feedback message can be implemented as a BDC message or other types of messages, which are not limited here.

When it is determined that the target vehicle is V2G-enabled, the cloud server can be informed that the target vehicle is V2G-enabled. The charging-discharging device can inform the cloud server through a second indication message. The second indication message is used to indicate that the target vehicle is V2G-enabled.

In some examples, after transmitting the V2G function feedback message to the charging-discharging device, the battery management system can wait for a period of time and then enter a sleeping state, to save energy consumption of the battery management system. For example, after transmitting the V2G function feedback message, the battery management system can power down and enter the sleeping state after 10 seconds.

In step S205, the charging-discharging device performs a V2G charging or V2G discharging for the target vehicle, in response to a received grid scheduling instruction.

When it is determined that the target vehicle is V2G-enabled, the grid, such as the State Grid, may transmit a grid scheduling instruction to the charging-discharging device, and the charging-discharging device receives the grid scheduling instruction and can follow the scheduling performed by the grid, such that the grid can perform an energy exchange with the target vehicle through the charging-discharging device.

The energy exchange may include a V2G charging and a V2G discharging. The V2G charging refers to the charging for the target vehicle performed by the grid through the charging-discharging device. Specifically, it is a power battery in the target vehicle that is charged by the grid through the charging-discharging device. The V2G discharging refers to the discharging for the target vehicle to the grid through the charging-discharging device. Specifically, it is the power battery in the target vehicle that is discharged to the grid through the charging-discharging device.

When the grid scheduling instruction is received, if the battery management system is in the sleeping state, the charging-discharging device can transmit a sleep wake-up signal to the battery management system, to wake up the battery management system. For example, when the grid scheduling instruction is received, the charging-discharging device can transmit an A+ signal to the battery management system, wherein the A+ signal is the sleep wake-up signal.

Figure 6:
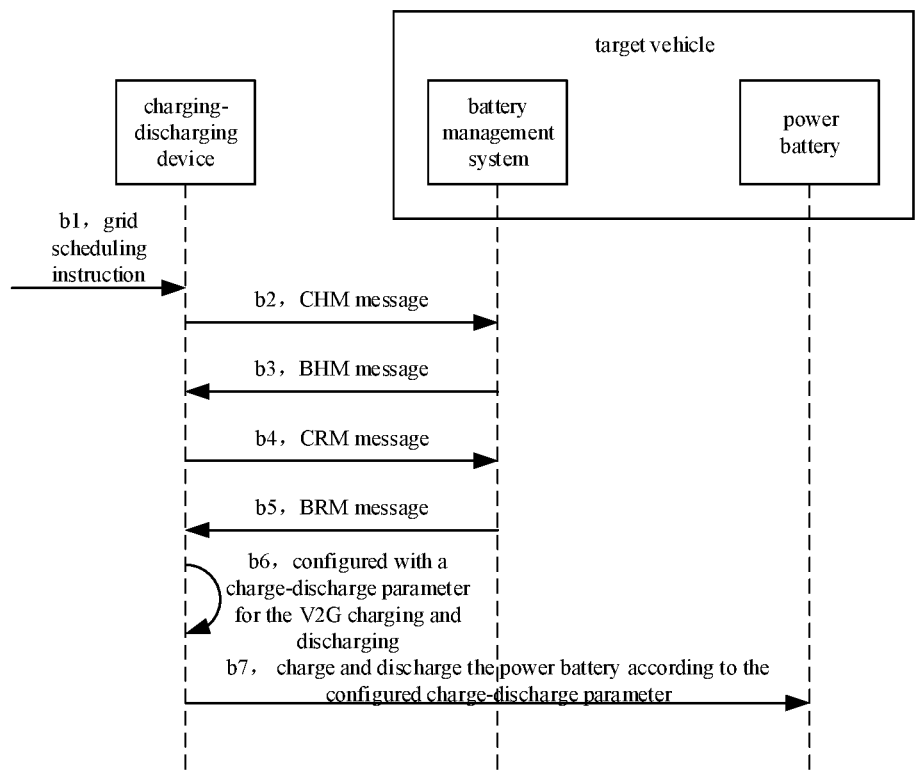
FIG. 6 is a flowchart of an example of a process of a V2G charging and discharging between the charging-discharging device and the target vehicle, provided by the embodiment of the present application.

For ease of illustration, the V2G charging and the V2G discharging are collectively referred to as a V2G charging and discharging. The V2G charging and discharging needs to wait for the scheduling performed by the grid. FIG. 6 is a flowchart of an example of a process of the V2G charging and discharging between the charging-discharging device and the target vehicle, provided by the embodiment of the present application. The target vehicle includes a battery management system and a power battery. As shown in FIG. 6, when the battery management system of the target vehicle is in the working state, the process of the V2G charging and discharging may include the following steps b1 to b7:

step b1, where the charging-discharging device receives the grid scheduling instruction;

step b2, where the charging-discharging device transmits a charger handshake message (i.e. a CHM message) to the battery management system;

step b3, where the battery management system transmits a battery management system handshake message (i.e. a BHM message) to the charging-discharging device, that is, the charging-discharging device receives the BHM message transmitted by the battery management system;

step b4, where the charging-discharging device transmits a charger recognition message (i.e. a CRM message) to the battery management system;

step b5, where the battery management system transmits a battery management system recognition message (i.e. a BRM message) to the charging-discharging device, that is, the charging-discharging device receives the BRM message transmitted by the battery management system;

step b6, where the charging-discharging device is configured with a charge-discharge parameter for the V2G charging and discharging;

step b7, where the charging-discharging device charges and discharges the power battery in the target vehicle according to the configured charge-discharge parameter.

If the battery management system of the target vehicle is in the sleeping state, the charging-discharging device may transmit, before step b1, a sleep wake-up signal to the battery management system to wake up the battery management system.

In the embodiment of the present application, the V2G-enabled charging-discharging device can implement not only the V2G charging and discharging for a V2G-enabled vehicle, but also the non-V2G charging for a V2G-disabled vehicle, so that the availability and applicability of the charging-discharging device are improved.

In some examples, when a V2G function feedback message is received from the battery management system within a preset period of time after transmitting the V2G function confirmation message, the charging-discharging device may make a direct communication interaction with the grid such as the State Grid, to request the grid to interact, through the grid scheduling instruction, with the charging-discharging device for the V2G scheduling.

In other examples, in response to the received second indication message, the cloud server transmits to the terminal device an indication message indicating that the target vehicle is V2G-enabled. The terminal device can issue a prompt message by means of display, sound, etc., to prompt the user that the target vehicle is V2G-enabled. When it is determined that the target vehicle is V2G-enabled, the terminal device transmits a V2G charging mode selection instruction to the cloud server, in response to a V2G charging mode selection input of a user. In response to the V2G charging mode selection instruction, the cloud server transmits a V2G charging instruction to the charging-discharging device, to enable the charging-discharging device to make a communication interaction with the grid, so as to request the grid to interact, through the grid scheduling instruction, with the charging-discharging device for the V2G scheduling. Alternatively, in response to the V2G charging mode selection instruction, the cloud server transmits a V2G charging instruction to the grid, to request the grid to interact, through the grid scheduling instruction, with the charging-discharging device for the V2G scheduling.

Figure 7:
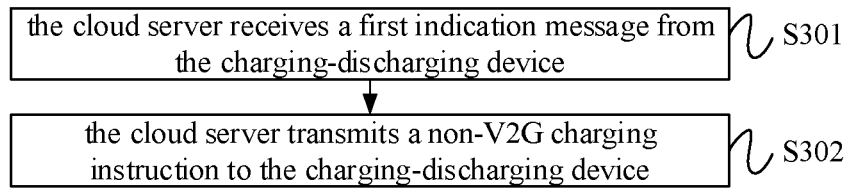
FIG. 7 is a flowchart of an embodiment of a method for charging-discharging interaction provided by the present application, which is applied to a cloud server.

Embodiments of the present application further provide a method for charging-discharging interaction, which can be applied to the cloud server. FIG. 7 is a flowchart of an embodiment of a method for charging-discharging interaction provided by the present application, which is applied to a cloud server. As shown in FIG. 7, the method for charging-discharging interaction may include steps S301 and step S302.

In step S301, the cloud server receives a first indication message from the charging-discharging device.

The first indication message is transmitted by the charging-discharging device when no V2G function feedback message is received within a preset period of time after transmitting the V2G function confirmation message to the battery management system of the target vehicle, and the first indication message is used to indicate that the target vehicle is V2G-disabled. The specific content of the first indication message may be found in the relevant description of the embodiments above, and will not be repeated here.

In step S302, the cloud server transmits a non-V2G charging instruction to the charging-discharging device.

The non-V2G charging instruction is used to instruct the charging-discharging device to perform a non-V2G charging for the target vehicle. The specific content of the non-V2G charging for the target vehicle performed by the charging-discharging device can be found in the relevant description of the embodiments above, and will not be repeated here.

In the embodiments of the present application, the charging-discharging device firstly transmits a V2G function confirmation message to the battery management system of the target vehicle, and does not receive a V2G function feedback message fed back by the battery management system within a preset period of time after transmitting the V2G function confirmation message, and it is indicated that the target vehicle is V2G-disabled. The charging-discharging device informs, through the first indication information, the cloud server that the target vehicle is V2G-disabled, and then the cloud server instructs, through a non-V2G charging instruction, the charging-discharging device to perform a non-V2G charging for the target vehicle, so that the V2G-enabled charging-discharging device can charge a V2G-disabled vehicle, thus improving the availability of the charging-discharging device.

Figure 8:
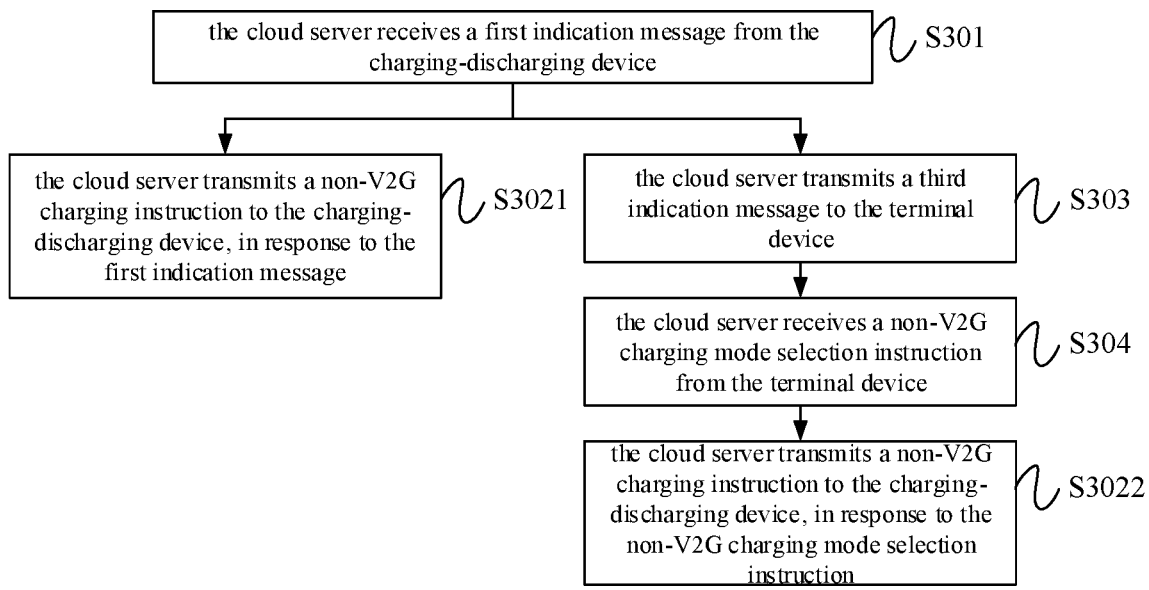
FIG. 8 is a flowchart of another embodiment of the method for charging-discharging interaction provided by the present application, which is applied to a cloud server.

The cloud server can transmit a non-V2G charging instruction directly to the charging-discharging device according to the first indication message; or the cloud server can interact with the terminal device, and transmit a non-V2G charging instruction to the charging-discharging device when the terminal device issues a non-V2G charging mode selection instruction. FIG. 8 is a flowchart of another embodiment of the method for charging-discharging interaction provided by the present application, which is applied to a cloud server. The difference between FIG. 8 and FIG. 7 is in that step S302 in FIG. 7 can be refined as step S3021 in FIG. 8, or the method for charging-discharging interaction shown in FIG. 8 may further include steps S303 and S304, and step S302 in FIG. 7 can be refined as step S3022 in FIG. 8.

In step S3021, the cloud server transmits a non-V2G charging instruction to the charging-discharging device, in response to the first indication message.

In response to the first indication message, the cloud server transmits a non-V2G charging instruction directly to the charging-discharging device, to instruct the charging-discharging device to perform a non-V2G charging for the target vehicle, which makes the process of the charging for a V2G-disabled vehicle performed by a V2G-enabled charging-discharging device more convenient and faster.

In step S303, the cloud server transmits a third indication message to the terminal device.

The specific content of the terminal device can be found in the relevant description of the embodiments above, and will not be repeated here.

The third indication message is used to indicate that the target vehicle is V2G-disabled, and the type and the form of the third indication message are not limited here. The cloud server informs, through the third indication message, the terminal device that the target vehicle is V2G-disabled, so that the terminal device can prompt the user that the target vehicle is V2G-disabled.

In step S304, the cloud server receives a non-V2G charging mode selection instruction from the terminal device.

The terminal device can further provide the user with a selectable energy exchange mode. When the target vehicle is V2G-disabled, the terminal device can provide the user with a non-V2G charging mode. The user can select the non-V2G charging mode through an input operation. The terminal device can transmit a non-V2G charging mode selection instruction to the cloud server, in response to the input of the user. The non-V2G charging mode selection instruction can be used to control the cloud server to instruct the charging-discharging device to perform the non-V2G charging for the target vehicle.

In step S3022, the cloud server transmits a non-V2G charging instruction to the charging-discharging device, in response to the non-V2G charging mode selection instruction.

The non-V2G charging instruction can be used to instruct the charging-discharging device to perform a non-V2G charging for the target vehicle.

Figure 9:
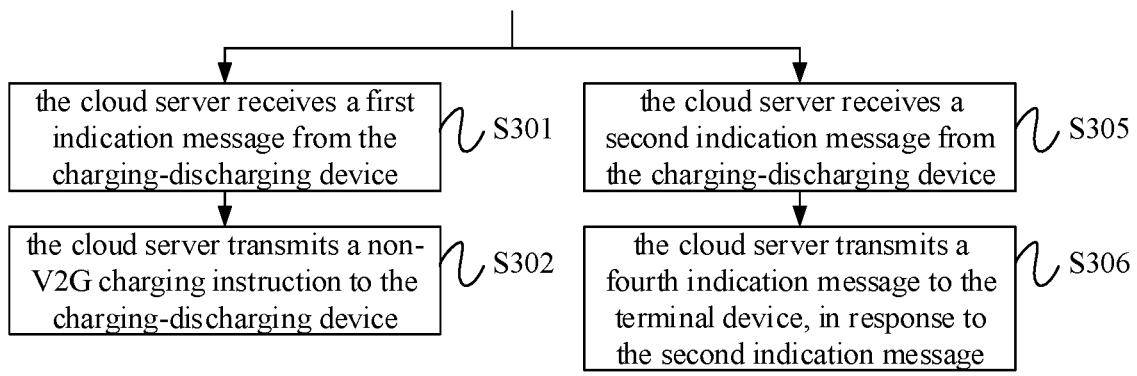
FIG. 9 is a flowchart of yet another embodiment of the method for charging-discharging interaction provided by the present application, which is applied to a cloud server.

When the target vehicle is V2G-enabled, the charging-discharging device can perform a V2G charging or a V2G discharging for the target vehicle. FIG. 9 is a flowchart of yet another embodiment of the method for charging-discharging interaction provided by the present application, which is applied to a cloud server. The difference between FIG. 9 and FIG. 7 is in that the method for charging-discharging interaction shown in FIG. 9 may further include steps S305 and S306.

In step S305, the cloud server receives a second indication message from the charging-discharging device.

The second indication message is transmitted by the charging-discharging device when a V2G function feedback message is received within a preset period of time after transmitting the V2G function confirmation message to the battery management system of the target vehicle, and the second indication message is used to indicate that the target vehicle is V2G-enabled. The charging-discharging device informs, through the second indication message, the cloud server that the target vehicle is V2G-enabled. The specific content of the second indication message may be found in the relevant description of the embodiments above, and will not be repeated here.

In step S306, the cloud server transmits a fourth indication message to the terminal device, in response to the second indication message.

The fourth indication message is used to indicate that the target vehicle is V2G-enabled. The cloud server informs, through the fourth indication message, the terminal device that the target vehicle is V2G-enabled, so that the terminal device can prompt that the target vehicle is V2G-enabled.

In some examples, when it is determined that the target vehicle is V2G-enabled, the terminal device transmits a V2G charging mode selection instruction to the cloud server, in response to a V2G charging mode selection input of the user. In response to the V2G charging mode selection instruction, the cloud server transmits a V2G charging instruction to the charging-discharging device to enable the charging-discharging device to make a communication interaction with the grid, so as to request the grid to interact, through the grid scheduling instruction, with the charging-discharging device for the V2G scheduling. Alternatively, in response to the V2G charging mode selection instruction, the cloud server transmits a V2G charging instruction to the grid to request the grid to interact, through the grid scheduling instruction, with the charging-discharging device for the V2G scheduling.

For ease of understanding, the following two examples are given to illustrate the process of charging a V2G-disabled target vehicle performed by a charging-discharging device.

Figure 10:
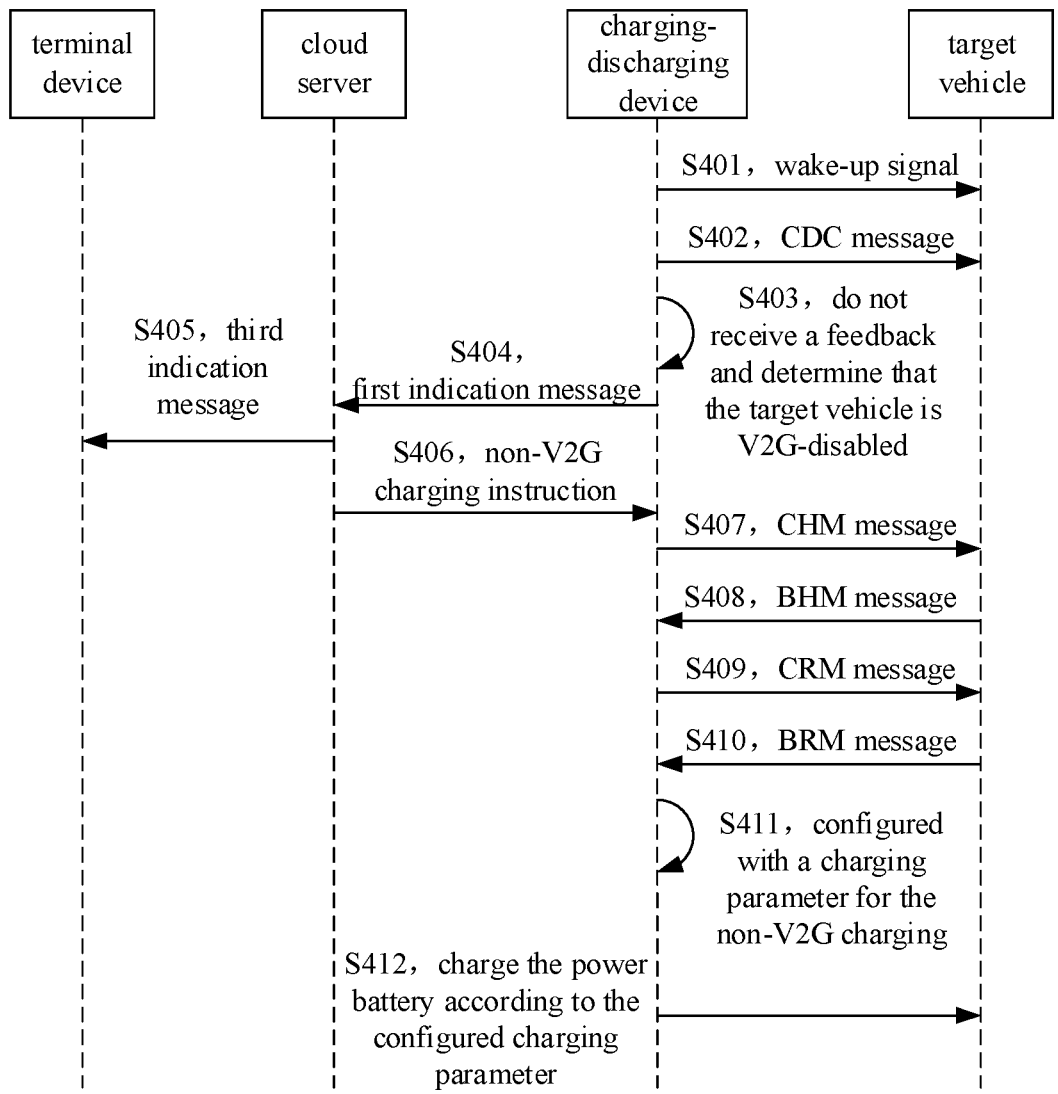
FIG. 10 is a flowchart of an example of a process of charging a V2G-disabled target vehicle by a charging-discharging device, provided by the embodiment of the present application.

FIG. 10 is a flowchart of an example of a process of charging a V2G-disabled target vehicle by a charging-discharging device, provided by the embodiment of the present application. As shown in FIG. 10, the process of charging a V2G-disabled target vehicle by a charging-discharging device may include steps S401 to S412.

In step S401, the charging-discharging device transmits a wake-up signal to the battery management system of the target vehicle, to wake up the battery management system;

In step S402, the charging-discharging device transmits a CDC message to the battery management system of the target vehicle;

In step S403, the charging-discharging device does not receive a BDC message transmitted by the battery management system of the target vehicle within a preset period of time, and determines that the target vehicle is V2G-disabled;

In step S404, when it is determined that the target vehicle is V2G-disabled, the charging-discharging device transmits a first indication message to the cloud server;

In step S405, in response to the first indication message, the cloud server transmits a third indication message to the terminal device;

In step S406, in response to the first indication message, the cloud server transmits a non-V2G charging instruction to the charging-discharging device;

In step S407, the charging-discharging device transmits a CHM message to the battery management system of the target vehicle;

In step S408, the battery management system of the target vehicle transmits a BHM message to the charging-discharging device;

In step S409, the charging-discharging device transmits a CRM message to the battery management system of the target vehicle;

In step S410, the battery management system of the target vehicle transmits a BRM message to the charging-discharging device;

In step S411, the charging-discharging device is configured with a charging parameter for the non-V2G charging;

In step S412, the charging-discharging device performs a charging for a power battery of the target vehicle according to the configured charging parameter, until the charging ends.

Figure 11:
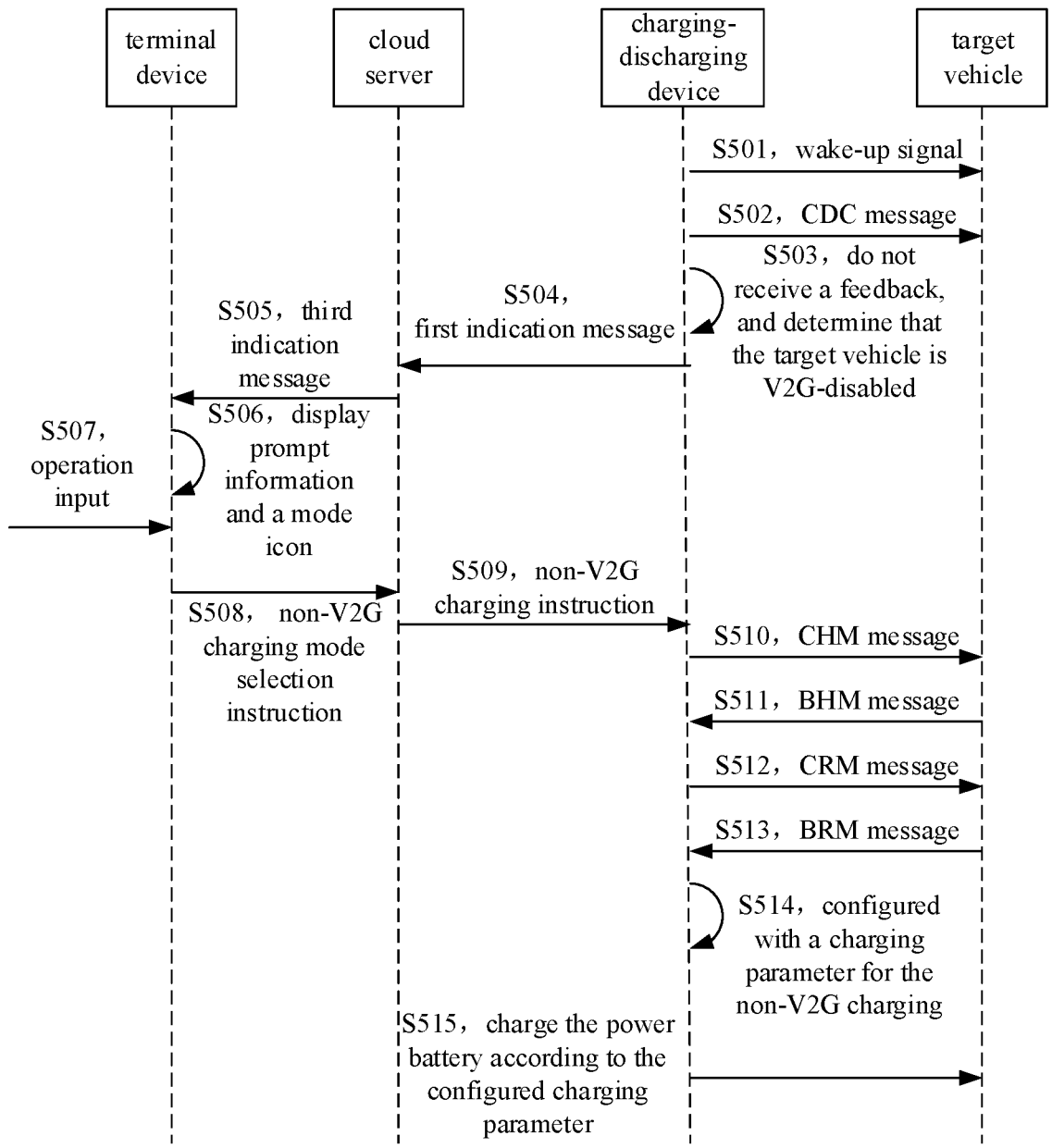
FIG. 11 is a flowchart of another example of a process of charging a V2G-disabled target vehicle by a charging-discharging device, provided by the embodiment of the present application.

FIG. 11 is a flowchart of another example of a process of charging a V2G-disabled target vehicle by a charging-discharging device, provided by the embodiment of the present application. As shown in FIG. 11, the process of charging a V2G-disabled target vehicle by a charging-discharging device may include steps S501 to S515.

In step S501, the charging-discharging device transmits a wake-up signal to the battery management system of the target vehicle, to wake up the battery management system;

In step S502, the charging-discharging device transmits a CDC message to the battery management system of the target vehicle;

In step S503, the charging-discharging device does not receive a BDC message transmitted by the battery management system of the target vehicle within a preset period of time, and determines that the target vehicle is V2G-disabled;

In step S504, when it is determined that the target vehicle is V2G-disabled, the charging-discharging device transmits a first indication message to the cloud server;

In step S505, in response to the first indication message, the cloud server transmits a third indication message to the terminal device;

In step S506, the terminal device displays prompt information and a mode icon, wherein the prompt information is used to prompt the user that the target vehicle is V2G-disabled, and the mode icon includes a non-V2G charging mode icon and a V2G charging mode icon;

In step S507, the terminal device receives an operation input indicating that the user selects the non-V2G charging mode icon;

In step S508, in response to the operation input of the user, the terminal device transmits a non-V2G charging mode selection instruction to the cloud server;

In step S509, in response to the non-V2G charging mode selection instruction, the cloud server transmits a non-V2G charging instruction to the charging-discharging device;

In step S510, the charging-discharging device transmits a CHM message to the battery management system of the target vehicle;

In step S511, the battery management system of the target vehicle transmits a BHM message to the charging-discharging device;

In step S512, the charging-discharging device transmits a CRM message to the battery management system of the target vehicle;

In step S513, the battery management system of the target vehicle transmits a BRM message to the charging-discharging device;

In step S514, the charging-discharging device is configured with a charging parameter for the non-V2G charging and discharging;

In step S515, the charging-discharging device performs a charging and discharging for a power battery of the target vehicle according to the configured charging parameter, until the charging ends.

Figure 12:
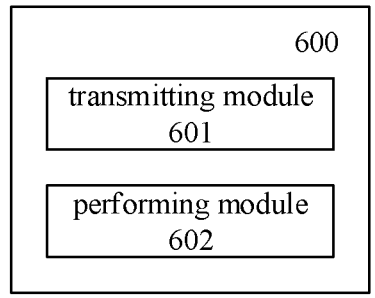
FIG. 12 is a structure schematic diagram of an embodiment of a charging-discharging device provided by the present application.

The embodiments of the present application further provide a charging-discharging device. FIG. 12 is a structure schematic diagram of an embodiment of a charging-discharging device provided by the present application. As shown in FIG. 12, the charging-discharging device 600 may include a transmitting module 601 and a performing module 602.

The transmitting module 601 may be configured to transmit a V2G function confirmation message to a battery management system of a target vehicle, and to transmit a first indication message to a cloud server to indicate that the target vehicle is V2G-disabled, when no V2G function feedback message fed back by the battery management system is received within a preset period of time after transmitting the V2G function confirmation message.

The performing module 602 may be configured to perform a non-V2G charging for the target vehicle, in response to a non-V2G charging instruction received from the cloud server.

In embodiments of the present application, the charging-discharging device firstly transmits a V2G function confirmation message to a battery management system of a target vehicle, and does not receive any V2G function feedback message fed back by the battery management system within a preset period of time after transmitting the V2G function confirmation message, and it is indicated that the target vehicle is V2G-disabled. The charging-discharging device informs, through a first indication message, a cloud server that the target vehicle is V2G-disabled and then the cloud server instructs, through a non-V2G charging instruction, the charging-discharging device to perform a non-V2G charging for the target vehicle, such that a V2G-enabled charging-discharging device can charge a V2G-disabled vehicle, thus improving the availability of the charging-discharging device.

In some examples, the non-V2G charging instruction is transmitted by the cloud server in response to the first indication message.

In other examples, the non-V2G charging instruction is transmitted by the cloud server in response to a non-V2G charging mode selection instruction from a terminal device. And the terminal device is communicatively connected with the cloud server.

In some examples, the transmitting module 601 described above may be further configured to transmit a wake-up signal to the battery management system. And the wake-up signal is used to wake up the battery management system.

In some examples, the transmitting module 601 described above may be further configured to transmit a second indication message to the cloud server, when a V2G function feedback message is received from the battery management system within a preset period of time after transmitting the V2G function confirmation message. The second indication message is used to indicate that the target vehicle is V2G-enabled.

The performing module 602 described above may be further configured to perform a V2G charging or V2G discharging for the target vehicle, in response to a received grid scheduling instruction.

Figure 13:
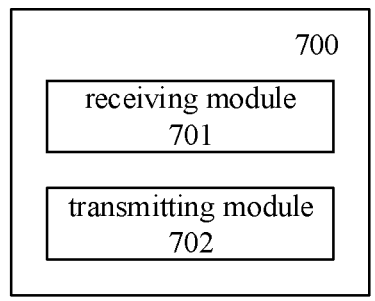
FIG. 13 is a structure schematic diagram of an embodiment of a cloud server provided by the present application.

The embodiments of the present application further provide a cloud server. FIG. 13 is a structure schematic diagram of an embodiment of a cloud server provided by the present application. As shown in FIG. 13, the cloud server 700 may include a receiving module 701 and a transmitting module 702.

The receiving module 701 may be configured to receive a first indication message from a charging-discharging device.

The first indication message is transmitted by the charging-discharging device when no V2G function feedback message is received within a preset period of time after transmitting a V2G function confirmation message to a battery management system of a target vehicle, and the first indication message is to indicate that the target vehicle is V2G-disabled.

The transmitting module 702 may be configured to transmit a non-V2G charging instruction to the charging-discharging device.

The non-V2G charging instruction is used to instruct the charging-discharging device to perform a non-V2G charging for the target vehicle.

In embodiments of the present application, the charging-discharging device firstly transmits a V2G function confirmation message to a battery management system of a target vehicle, and does not receive any V2G function feedback message fed back by the battery management system within a preset period of time after transmitting the V2G function confirmation message, and it is indicated that the target vehicle is V2G-disabled. The charging-discharging device informs, through the first indication message, a cloud server that the target vehicle is V2G-disabled and then the cloud server instructs, through the non-V2G charging instruction, the charging-discharging device to perform a non-V2G charging for the target vehicle, such that a V2G-enabled charging-discharging device can charge a V2G-disabled vehicle, thus improving the availability of the charging-discharging device.

In some examples, the transmitting module 702 described above may be configured to transmit the non-V2G charging instruction to the charging-discharging device, in response to the first indication message.

In other examples, the transmitting module 702 described above may be further configured to transmit a third indication message to a terminal device, wherein the third indication message is used to indicate that the target vehicle is V2G-disabled.

The receiving module 701 described above may be further configured to receive a non-V2G charging mode selection instruction from the terminal device.

The transmitting module 702 described above may be configured to transmit the non-V2G charging instruction to the charging-discharging device, in response to the non-V2G charging mode selection instruction.

In some examples, the receiving module 701 described above may be further configured to receive a second indication message from the charging-discharging device.

The second indication message is transmitted by the charging-discharging device when a V2G function feedback message is received within a preset period of time after transmitting a V2G function confirmation message to a battery management system of a target vehicle, and the second indication message is to indicate that the target vehicle is V2G-enabled.

The transmitting module 702 described above may be further configured to transmit a fourth indication message to a terminal device, in response to the second indication message.

The fourth indication message is used to indicate that the target vehicle is V2G-enabled, and the terminal device is communicatively connected with the cloud server.

Figure 14:
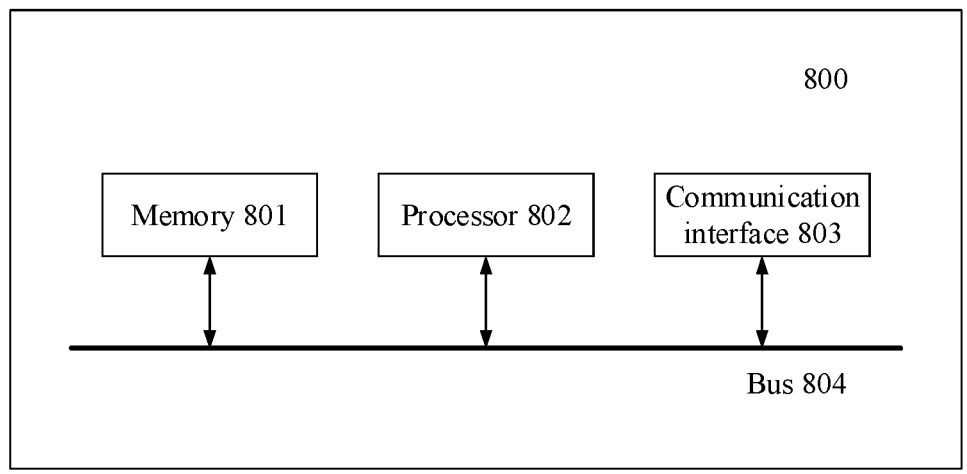
FIG. 14 is a hardware structure schematic diagram of an embodiment of a charging-discharging device provided by the present application.

The embodiment of the present application further provides a charging-discharging device. FIG. 14 is a hardware structure schematic diagram of an embodiment of a charging-discharging device provided by the present application. As shown in FIG. 14, the charging-discharging device 800 includes a memory 801, a processor 802, and computer programs stored on the memory 801 that can be executed on the processor 802.

In one example, the processor 802 described above may include a central processor (CPU) or an Application Specific Integrated Circuit (ASIC), or may be configured as one or more integrated circuits implementing embodiments of the present application.

The memory 801 may include a read-only memory (ROM), a random access memory (RAM), a disk storage medium device, an optical storage medium device, a flash memory device, electrical, optical or other physical/tangible memory storage devices. Thus, in general, the memory includes one or more tangible (non-transitory) computer-readable storage media (e.g., memory devices) encoded with software including computer executable instructions, wherein the software, when executed (for example, by one or more processors), is operable to perform the operation described with reference to the method for charging-discharging interaction applied to a charging-discharging device in accordance with the embodiment of the present application.

The processor 802 runs a computer program corresponding to an executable program code by reading the executable program code stored in the memory 801, to implement the method for charging-discharging interaction applied to a charging-discharging device in the embodiment above.

In one example, the charging-discharging device 800 may further include a communication interface 803 and a bus 804. As shown in FIG. 14, the memory 801, the processor 802 and the communication interface 803 are connected through the bus 804 and communicate with each other.

The communication interface 803 is mainly used for the communication between various modules, apparatuses, units and/or devices in the embodiment of the present application. Furthermore, an input device and/or output device may be attached through the communication interface 803.

The bus 804 includes hardware, software, or both, to couple components of the charging-discharging device 800 to each other. For example, the bus 804 may include, but not limited to, an accelerated graphics port (AGP) or other graphics buses, enhanced industrial standard architecture (EISA) bus, front side bus (FSB), Hyper Transport (HT) interconnection, industrial standard architecture (ISA) bus, infinite bandwidth interconnection, low pin count (LPC) bus, memory bus, micro channel architecture (MCA) bus, peripheral component interconnect (PCI) bus, PCI-Express (PCI-X) bus, Serial Advanced Technology Attachment (SATA) bus, Video Electronics Standards Association Local Bus (VLB) bus or other suitable buses or combination of two or more of the foregoing. As appropriate, the bus 804 may include one or more buses. Although particular buses are described and illustrated in the embodiment of the present application, any suitable bus or interconnection is considered by the present application.

Figure 15:
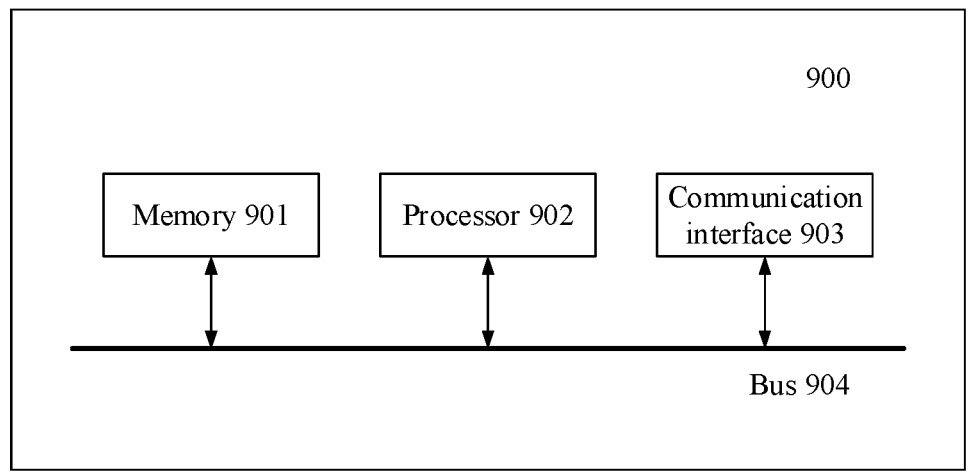
FIG. 15 is a hardware structure schematic diagram of an embodiment of a cloud server provided by the present application.

The embodiment of the present application further provides a cloud server. FIG. 15 is a hardware structure schematic diagram of an embodiment of a cloud server provided by the present application. As shown in FIG. 15, the cloud server 900 includes a memory 901, a processor 902, and computer programs stored on the memory 901 that can be executed on the processor 902.

In one example, the processor 902 described above may include a central processor (CPU) or an Application Specific Integrated Circuit (ASIC), or may be configured as one or more integrated circuits implementing embodiments of the present application.

The memory 901 may include a read-only memory (ROM), a random access memory (RAM), a disk storage medium device, an optical storage medium device, a flash memory device, electrical, optical or other physical/tangible memory storage devices. Thus, in general, the memory includes one or more tangible (non-transitory) computer-readable storage media (e.g., memory devices) encoded with software including computer executable instructions, wherein the software, when executed (for example, by one or more processors), is operable to perform the operation described with reference to the method for charging-discharging interaction applied to a cloud server in accordance with the embodiment of the present application.

The processor 902 runs a computer program corresponding to an executable program code by reading the executable program code stored in the memory 901, to implement the method for charging-discharging interaction applied to a cloud server in the embodiment above.

In one example, the cloud server 900 may further include a communication interface 903 and a bus 904. As shown in FIG. 15, the memory 901, the processor 902 and the communication interface 903 are connected through the bus 904 and communicate with each other.

The communication interface 903 is mainly used for the communication between various modules, apparatuses, units and/or devices in the embodiment of the present application. Furthermore, an input device and/or output device may be attached through the communication interface 903.

The bus 904 includes hardware, software, or both, to couple components of the cloud server 900 to each other. For example, the bus 904 may include, but not limited to, an accelerated graphics port (AGP) or other graphics buses, enhanced industrial standard architecture (EISA) bus, front side bus (FSB), Hyper Transport (HT) interconnection, industrial standard architecture (ISA) bus, infinite bandwidth interconnection, low pin count (LPC) bus, memory bus, micro channel architecture (MCA) bus, peripheral component interconnect (PCI) bus, PCI-Express (PCI-X) bus, Serial Advanced Technology Attachment (SATA) bus, Video Electronics Standards Association Local Bus (VLB) bus or other suitable buses or combination of two or more of the foregoing. As appropriate, the bus 904 may include one or more buses. Although particular buses are described and illustrated in the embodiment of the present application, any suitable bus or interconnection is considered by the present application.

The embodiment of the present application further provides a charge-discharge system. The charge-discharge system may include a charging-discharging device and a cloud server in the embodiments above. The specific content of the charging-discharging device, the cloud server, the method for charging-discharging interaction performed by the charging-discharging device, and the method for charging-discharging interaction performed by the cloud server, etc., can be found in the relevant description in the embodiments above, and will not be repeated here.

In other embodiments, the charge-discharge system may further include a terminal device. The terminal device can be used to receive from the cloud server an indication message indicating that the target vehicle is V2G-enabled or an indication message indicating that the target vehicle is V2G-disabled. The specific content of the terminal device and the interaction process between the terminal device and other devices and apparatuses can be found in the relevant description in the embodiments above, and will not be repeated here.

The embodiment of the present application further provides a computer-readable storage medium having computer program instructions stored thereon, which when executed by the processor, can implement the method for charging-discharging interaction applied to the charging-discharging device or the method for charging-discharging interaction applied to the cloud server in the above embodiment and can achieve the same technical effect, and the detail of the computer-readable storage medium is not described in detail in order to avoid repetition. The computer-readable storage medium described above may include a non-transient computer-readable storage medium, such as Read-Only Memory (ROM), Random Access Memory (RAM), magnetic disk or optical disk, etc., which are not limited here.

It is noted that, various embodiments in this description are all described in a progressive manner, and the same or similar parts of the various embodiments can refer to each other, and each embodiment focuses on the differences from other embodiments. For charging-discharging device embodiments, cloud server embodiments, charge-discharge system embodiments, and computer-readable storage media embodiments, relevant parts can be found in the description section of the method embodiments. The present application is not limited to the specific steps and structures described above and shown in the figures. After understanding the spirit of the present application, those skilled in the art may make various changes, modifications and additions, or change the order of steps. For the sake of brevity, a detailed description of the known methods and techniques is omitted here.

Various aspects of the present application are described above, with reference to flowcharts and/or block diagrams of methods, apparatuses (systems) and computer program products according to embodiments of the present application. It should be understood that each block in the flowcharts and/or block diagrams and the combination of various blocks in the flowcharts and/or block diagrams can be implemented by computer program instructions. These computer program instructions may be provided to a processor of a general-purpose computer, a special-purpose computer, or other programmable data processing apparatuses to generate a machine, so that these instructions executed by the processor of the computer or other programmable data processing apparatuses enable the implementation of the functions/actions specified in one or more blocks in the flowcharts and/or block diagrams. Such a processor may be, but not limited to, a general-purpose processor, a special-purpose processor, a special application processor, or a field programmable logic circuit. It is also understood that each block in the block diagrams and/or flowcharts and the combination of blocks in the block diagrams and/or flowcharts may also be implemented by a special-purpose hardware that performs a specified function or action, or by a combination of a special-purpose hardware and computer instructions.

Although the present application has been described with reference to preferred embodiments, various improvements can be made thereto and components or steps thereof may be replaced with equivalents, without departing from the scope of the present application. In particular, various technical features mentioned in various embodiments can be combined in any way as long as there is no conflict. The present application is not limited to the specific embodiments disclosed herein, but includes all technical solutions that fall within the scope of claims.

What is claimed is:

1. A method for charging-discharging interaction, comprising:
    transmitting, by a charging-discharging device, a vehicle-to-grid (V2G) function confirmation message to a battery management system of a target vehicle;
    transmitting, by the charging-discharging device, a first indication message to a cloud server to indicate that the target vehicle is V2G-disabled, when no V2G function feedback message fed back by the battery management system is received within a preset period of time after transmitting the V2G function confirmation message;
    performing, by the charging-discharging device, a non-V2G charging for the target vehicle, in response to a non-V2G charging instruction received from the cloud server,
    wherein the non-V2G charging instruction is transmitted by the cloud server in response to the first indication message or a non-V2G charging mode selection instruction from a terminal device communicatively connected with the cloud server.

2. The method for charging-discharging interaction according to claim 1, wherein before the transmitting by a charging-discharging device, a V2G function confirmation message to a battery management system of a target vehicle, the method further comprises:
    transmitting, by the charging-discharging device, a wake-up signal to the battery management system to wake up the battery management system.

3. The method for charging-discharging interaction according to claim 1, wherein after the transmitting, by a charging-discharging device, a V2G function confirmation message to a battery management system of a target vehicle, the method further comprises:
    transmitting, by the charging-discharging device, a second indication message to the cloud server to indicate that the target vehicle is V2G-enabled, when a V2G function feedback message fed back by the battery management system is received within the preset period of time after transmitting the V2G function confirmation message;
    performing, by the charging-discharging device, a V2G charging or V2G discharging for the target vehicle, in response to a received grid scheduling instruction.

4. A charging-discharging device, comprising:
    a processor; and
    a memory storing computer program instructions,
    wherein the processor, when executing the computer program instructions, implements the method for charging-discharging interaction according to claim 1.

5. A method for charging-discharging interaction, comprising:
    receiving, by a cloud server, a first indication message from a charging-discharging device, wherein the first indication message is transmitted by the charging-discharging device when no V2G function feedback message is received within a preset period of time after transmitting a V2G function confirmation message to a battery management system of a target vehicle, and the first indication message is to indicate that the target vehicle is V2G-disabled;

transmitting, by the cloud server, a non-V2G charging instruction to the charging-discharging device, to instruct the charging-discharging device to perform a non-V2G charging for the target vehicle, wherein the transmitting, by the cloud server, a non-V2G charging instruction to the charging-discharging device comprises:

transmitting, by the cloud server, the non-V2G charging instruction to the charging-discharging device, in response to the first indication message or a non-V2G charging mode selection instruction from a terminal device communicatively connected with the cloud server.

6. The method for charging-discharging interaction according to claim 5, wherein before the transmitting, by the cloud server, a non-V2G charging instruction to the charging-discharging device, the method further comprises:

transmitting, by the cloud server, a third indication message to the terminal device, to indicate that the target vehicle is V2G-disabled;

receiving, by the cloud server, the non-V2G charging mode selection instruction from the terminal device.

7. The method for charging-discharging interaction according to claim 5, further comprising:

receiving, by the cloud server, a second indication message from the charging-discharging device, wherein the second indication message is transmitted by the charging-discharging device when a V2G function feedback message is received within the preset period of time after transmitting the V2G function confirmation message to the battery management system of the target vehicle, and the second indication message is to indicate that the target vehicle is V2G-enabled;

transmitting, by the cloud server, a fourth indication message to a terminal device in response to the second indication message, to indicate that the target vehicle is V2G-enabled, wherein the terminal device is communicatively connected with the cloud server.

8. A cloud server, comprising:

a processor; and a memory storing computer program instructions, wherein the processor, when executing the computer program instructions, implements the method for charging-discharging interaction according to claim 5.

9. A non-transitory computer-readable storage medium, having computer program instructions stored thereon, which, when executed by a processor, implement the method for charging-discharging interaction according to claim 5.

* * * * *